United States Patent [19]
Bartels

[11] 3,809,975
[45] May 7, 1974

[54] MOTOR SPEED CONTROL APPARATUS FOR AN ELECTRICALLY POWERED VEHICLE

[76] Inventor: John H. Bartels, 160 Poplar, Elmhurst, Ill. 60126

[22] Filed: Jan. 22, 1973

[21] Appl. No.: 325,319

[52] U.S. Cl.................. 318/39, 318/139, 318/332
[51] Int. Cl. ............................................ H02p 5/16
[58] Field of Search...................... 318/39, 139, 332

[56] References Cited
UNITED STATES PATENTS

| 3,633,081 | 1/1972 | Weber | 318/39 |
| 3,626,262 | 12/1971 | Kelling | 318/39 |
| 3,545,310 | 12/1970 | Porath | 318/39 |

Primary Examiner—Bernard A. Gilheany
Assistant Examiner—Thomas Langer
Attorney, Agent, or Firm—Merriam, Marshall, Shapiro & Klose

[57] ABSTRACT

A motor speed control apparatus for automatically reducing the speed of an electrically powered vehicle (e.g., a riding lawnmower) responsive to the traction motor and/or an auxiliary motor being overloaded is disclosed. More particularly, battery means comprising a DC battery are included for applying DC potential to the traction motor and the auxiliary motor (e.g., turning a cutting blade) which may be overloaded due to excessive vehicular speed. The vehicle's speed is determined by the DC potential applied to the traction motor while the current drawn by either motor is determined by the torque required (i.e., loading) of that motor. Means for stabilizing the DC potential applied to the traction motor are provided to maintain the vehicle's speed at the level selected by the operator. Whenever the current drawn by either the traction motor or the auxiliary motor exceeds a predetermined threshold, current limiting means are effective to automatically reduce the DC potential applied to the traction motor until the current drawn by both motors is below the threshold. Moreover, high-speed comparator means are included to monitor the instantaneous current drawn by the traction motor so that the stabilizing means are disabled whenever the instantaneous current exceeds a predetermined level.

8 Claims, 2 Drawing Figures

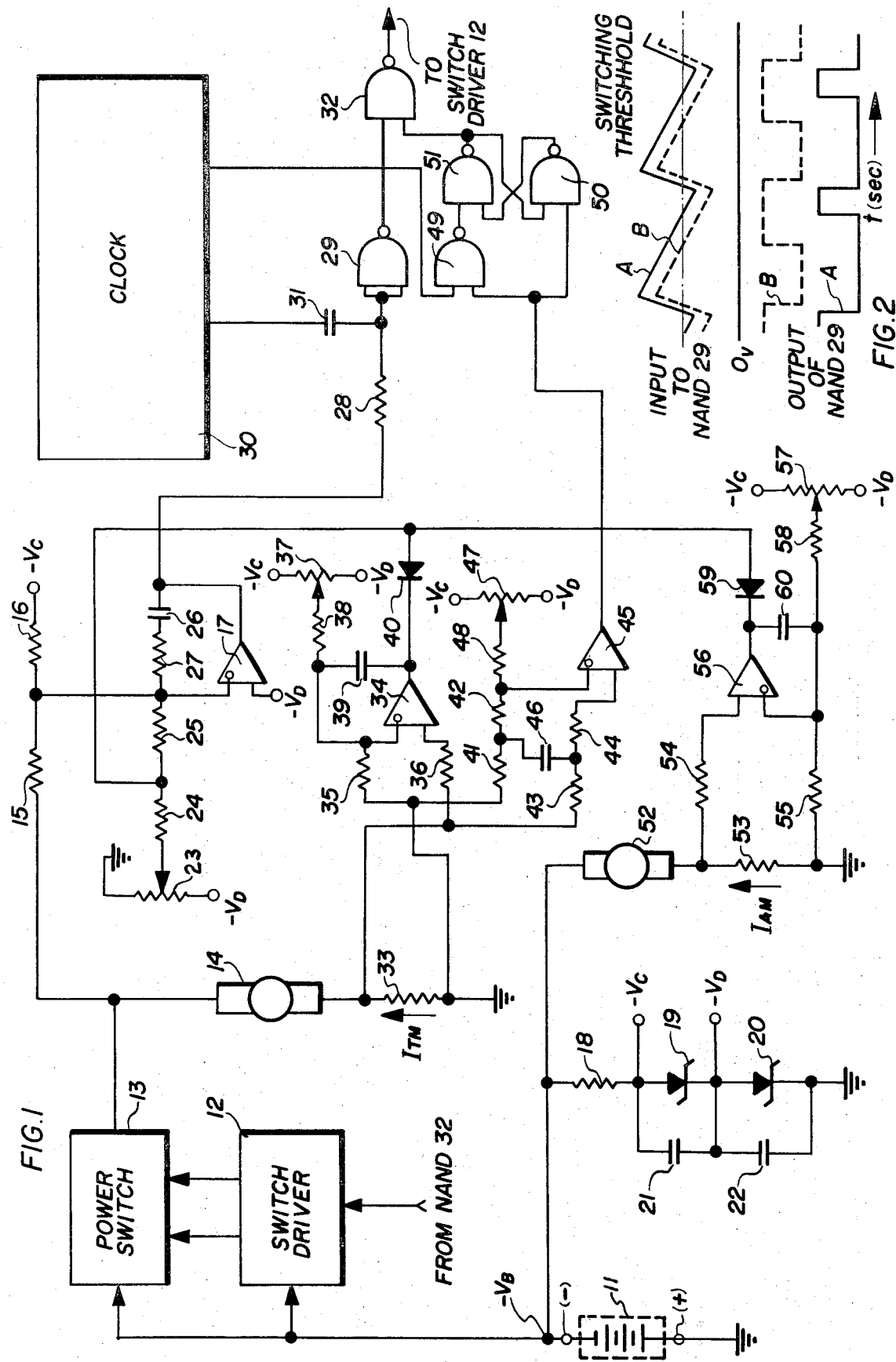

MOTOR SPEED CONTROL APPARATUS FOR AN ELECTRICALLY POWERED VEHICLE

BACKGROUND OF THE INVENTION

The present invention relates generally to control circuits for electrically powered vehicles and more particularly to a motor speed control apparatus for reducing the speed of an electric traction motor responsive to excessive loading of either the traction motor or an auxiliary motor, included, for example, to drive a cutting blade or the like.

Reference may be made to the following U.S. Pat. Nos.: 3,686,549; 3,663,875; 3,636,422; 3,623,301; 3,570,227; 3,562,617; 3,550,714; 3,381,456; 3,230,695; and 2,906,081.

Electrically powered vehicles, such as riding lawnmowers or snow blowers, commonly include a pair of DC electric motors: a primary, or traction, motor for propelling the vehicle and an auxiliary motor for driving the cutting blade. A DC battery supply is commonly provided so that the vehicle can be operated without the restrictions on its maneuverability that are generally associated with the use of an AC power cord.

The speed of the vehicle with normal running load torques is essentially proportional to the voltage applied to the DC traction motor. Accordingly, to maintain a reasonably constant speed regardless of the terrain across which the vehicle is driven, a voltage regulating apparatus may be included to insure that the voltage applied to the traction motor is constant. The voltage regulating apparatus, however, may prove to be detrimental under certain circumstances. For example, if the voltage applied to the traction motor is suddenly increased in order to accelerate the vehicle or if the vehicle is driven up a steep incline, the traction motor must develop more torque to propel the vehicle at the desired speed. The current drawn by the traction motor, in turn, is directly proportional to the torque developed by the motor. Accordingly, the controller and/or the traction motor may be damaged by the resultant current when the voltage regulator maintains the voltage applied to the traction motor at a desired level despite the torque required.

Similarly, when the vehicle is moving at a significant speed in deep grass or snow and suddenly strikes a hidden rock or stake for example, bringing it to a sudden halt, the traction motor develops a large torque responsive to the voltage regulator attempting to maintain its speed. Accordingly, there is a sharp increase in the current drawn by the motor, and it or the controller may possibly be damaged before the operator can take corrective action. Further, the excessive currents developed in the motor may severely drain the DC battery power supply if it continues for an extended period of time.

Similar problems arise when the auxiliary motor draws excessive current. In a riding lawnmower, for example, the auxiliary motor is operated at high speeds to turn the cutting blade, and consequently, it is relatively unimportant that it turn at an adjustable variable speed. Accordingly, the auxiliary motor may be directly connected to the battery without the provision of a voltage regulating arrangement. If, however, the traction motor propels the mower through dense or high grass at a high rate of speed, the auxiliary motor may be loaded so that it, too, draws an excessive current therein. That is, the torque required of the auxiliary motor to move the cutting blade through the grass increases significantly as the mower is propelled through increasingly dense grass at high speeds. Of course, if the mower is operated under such conditions for an extended period of time, the auxiliary motor may be damaged, requiring expensive repair.

SUMMARY OF THE INVENTION

The motor speed control apparatus of the present invention monitors the current drawn by an auxiliary motor as well as that drawn by a primary motor and adjusts the speed of the primary motor accordingly whenever either of the monitored current exceeds a preselected threshold level. The apparatus includes battery means for applying a DC potential to both the primary and auxiliary motors. The DC potential applied to the primary motor determines the speed of the primary motor while the respective currents drawn by the primary and auxiliary motors are dependent on the torque required (i.e., loading) of that motor. Stabilizing means are provided for stabilizing the DC potential applied to the primary motor so that its speed may be maintained constant at an operator-selected level. Current limiter means are also included to modify, or override, the stabilizing means whenever the current drawn by either the primary or the auxiliary motor exceeds a predetermined threshold. The current limiting means is effective to reduce the DC potential applied to the primary motor until the currents drawn by the primary and auxiliary motors is below the predetermined threshold.

As a further feature of the invention, high-speed comparator means may be included to monitor the instantaneous current drawn by the primary motor. Accordingly, when the instantaneous primary motor current exceeds a preselected level, the high-speed comparator means disables the battery means until the circumstances giving rise to the excessive instantaneous current are corrected.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIG. 1 is a combined block and schematic diagram of a motor speed control apparatus in accordance with a preferred embodiment of the invention; and FIG. 2 is illustrative of selected wave forms associated with operation of the motor speed control apparatus of the preferred embodiment.

PREFERRED EMBODIMENT OF THE INVENTION

Referring now to FIG. 1, it may be seen that a battery 11, having its positive terminal coupled to ground, applies a negative DC operating potential (e.g., $-36$ VDC), $-V_B$, to the switch driver 12 and the power switch 13 which combine to form a switching-mode regulator, also commonly referred to as a pulse-width modulator or chopper. The power switch 13, in turn, develops a pulse train which is applied to a DC electric traction motor 14 provided to propel the vehicle. By varying the duty cycle of the pulses, the level of DC potential applied to the traction motor 14 can be correspondingly varied. Accordingly, the speed of the traction motor 14, which is directly proportional to the DC potential applied thereto, can be adjusted by varying the width of the pulses developed by power switch 13.

The output pulse train from power switch 13, in addition to being applied to the traction motor 14, is coupled to one end of a voltage divider comprising serially connected resistors 15 and 16. A second source of negative DC potential, herein designated $-V_C$, is coupled to the other end of the voltage divider. The potential developed at the junction of resistors 15 and 16 is then coupled to one input of an "error" amplifier 17, having its other input coupled to a third source of negative DC potential, $-V_D$.

The $-V_C$ and $-V_D$ potentials may be conveniently obtained by coupling a resistor 18 and a pair of Zener diodes 19 and 20 between the negative terminal of battery 11 and ground. Resistor 18 drops the output voltage at the negative terminal of battery 11 to a suitable intermediate value, $-V_C$, (e.g., $-24$VDC) which is stabilized at that level by the serially connected Zener diodes 19 and 20. The voltage drop across the Zener diode 20, in turn, develops another intermediate potential, $-V_D$, (e.g., $-12$VDC) at the junction of Zener diodes 19 and 20. A pair of capacitors 21 and 22 parallel Zener diodes 19 and 20, respectively, to bypass the corresponding junctions to ground.

A manually operative accelerator, comprising potentiometer 23 coupled between the $-V_D$ reference potential and ground, is also provided. The wiper arm of potentiometer 23 is, in turn, coupled through a pair of serially connected resistors 24 and 25 to the junction of resistors 15, 16 and the inverting input of error amplifier 17. Operationally, the accelerator potentiometer 23 develops a positive going speed control voltage, with respect to $-V_D$, which is proportional to speed at which the driver wishes to operate the vehicle. This control voltage is then matrixed by means of resistors 24 and 25 with the negative voltage applied to the traction motor 14 and coupled to the input of error amplifier 17. Accordingly, the signal developed at the output of amplifier 17 is representative of the deviation between the DC potential applied to the traction motor 14 and the DC potential required to maintain the vehicle at a desired speed.

A feedback arrangement comprising capacitor 26 and resistor 27 applies a portion of the output signal to the input of error amplifier 17 so that a DC output signal is developed. A resistor 28 applies the DC output voltage from amplifer 17 to the input of a NAND gate 29, and a clock 30 AC couples a sawtooth signal through capacitor 31 to the junction of resistor 28 and the input of NAND 29. Accordingly, the sawtooth signal is DC shifted to a level determined by the DC voltage developed at the output of error amplifier 17, and the time intervals during which the NAND gate 29 is in its respective high (1) and low (0) states will vary depending on the DC voltage component supplied by amplifier 17. Consequently, as may be more clearly understood by reference to FIG. 2, the duty cycle of the positive going and pulse produced at the output of NAND 29 increases as the negative DC potential developed at amplifier 17 increases responsive to incremental decreases in the DC potential applied to the traction motor 14. The output pulses from NAND 29 are subsequently applied to a second NAND gate 32 which further sharpens the square wave pulses.

The negative-going pulse train from NAND 32 is then applied to the switch driver 12 which, in turn, varies the duty cycle of the output pulses from power switch 13 that are to the supplied to the traction motor 14. Accordingly, the feedback arrangement just described operates to stabilize the DC potential applied to the traction motor 14 so that a nearly constant speed is maintained. A corresponding analysis would hold if the DC voltage applied to the traction motor 14 tended to increase.

As previously mentioned, although it is desirable under most circumstances to maintain the traction motor 14 at a constant speed, there are certain situations where the torque required of the traction motor 14 causes it to draw a large current from the battery 11, potentially damaging the motor 14. Accordingly, in addition to regulating the voltage applied to the traction motor 14, the motor speed control arrangement of the present invention also includes a maximum input current circuit for limiting the input current supplied traction motor 14 to a desired maximum DC value independent of motor speed.

Thus, a resistor 33 is placed in series with the traction motor 14 between the output of power switch 13 and ground to monitor the current drawn by the traction motor 14. The voltage analog developed across resistor 33 responsive to the traction motor current, $I_{TM}$, is applied across the inputs of an amplifier 34 by resistors 35 and 36. A potentiometer 37, coupled between the $-V_C$ and $-V_D$ reference potentials, is adjustable to provide a DC voltage at its wiper arm which, when coupled through resistor 38 to the junction of resistor 35 and the input of amplifier 34, sets a maximum threshold on the DC current which can be drawn by the traction motor 14 before amplifier 34 will become operational. Accordingly, when the current $I_{TM}$ through resistor 33 exceeds the threshold set by potentiometer 37, the amplifier 34 develops a negative DC output voltage. A feedback capacitor 39 interconnects the output and input of amplifier 34 to suppress ripple in the DC voltage developed by amplifier 34.

The DC voltage is, in turn, applied through diode 40 to the junction of resistors 24 and 25 in the traction motor voltage regulating loop. The output impedance of amplifer 34 is very low relative to the impedance of resistors 24 and 25, and consequently, the output voltage from amplifier 34 will override the accelerator control voltage from potentiometer 23. The output potential developed by error amplifier 17 will, therefore, be limited at a predetermined DC level. Thus, when the maximum input current circuit is enabled, the duty cycle of the pulses generated at the output of power switch 13 will be correspondingly limited so that the DC voltage is no longer regulated. Accordingly, the torque of the traction motor 14 is limited and the vehicle will slow down because additional torque is not available.

Under certain previously described circumstances, however, the maximum current input circuit, comprising amplifiers 34 and 17, is incapable of reacting in a sufficiently short time to reduce the DC voltage applied to the traction motor. This may occur, for example, if the mower strikes an object which impedes its continued movement, or if the mower is accelerated while its brake is locked to prevent its movement. Thus, provision is also made to immediately disable the switching-mode regulator in the event that the instantaneous current through the traction motor 14 exceeds a maximum level above which the controller power switch 13 of the motor 14 would damaged.

Accordingly, a high-speed comparator circuit is included which also monitors the voltage analog of the current ($I_{TM}$) conducted through resistor 33. Two pair of serially connected resistors, one pair comprising resistors 41 and 42 and the second pair comprising resistors 43 and 44, couple the voltage analog across the inputs of an amplifier 45. A capacitor 46 couples the junction of resistors 41 and 42 to the junction of resistors 43 and 44. An instantaneous current threshold is determined by coupling the wiper of potentiometer 47 to the input of amplifier 45. More particularly, the potentiometer 47 is connected between the $-V_C$ and $-V_D$ sources of DC potential and its wiper arm is coupled by resistor 48 to the junction of resistor 42 and the corresponding input of amplifier 45.

When the instantaneous current ($I_{TM}$) through resistor 33 exceeds the threshold level determined by potentiometer 47, amplifier 45 is enabled to switch the inputs of a pair of NAND gates 49 and 50, respectively, from their normally "high" (1) state to their respective "low" (0) states. NAND 50 together with NAND gate 51, which also has an input coupled to the output of NAND 49, comprises an RS flip-flop. Thus, when the input of NAND 50 is switched to its low, or 0, state, it "sets" the flip-flop to develop a low (0) signal at the output of NAND 51. This low (0) signal is, in turn, applied to the other input of NAND 32, forcing it to its high (1) state so that the switch driver 12 and the power switch 13 are effectively disabled. Accordingly, the power to the traction motor 14 is immediately cut off.

Once the voltage to the traction motor 14 is cutoff, the output signal from amplifier 45 will return the corresponding inputs to NANDs 49 and 50 to a high (1) level. Consequently, a positive-going clock pulse from clock 30 applied to the other input of NAND 49 resets the RS flip-flop, enabling the switch driver 12 and the power switch 13. Of course, if the condition which initially caused the disabling of the switching-mode regulator still prevails, the system will be immediately disabled again. Once the problem is corrected, however, the mower will be enabled.

An auxiliary motor 52 is also provided and may be used, for example, to turn the cutting blade of a riding mower. It is not necessary to regulate the speed of the auxiliary motor 52 because its only function is to drive the cutting blade. At the speeds at which it is operated, any speed variation of the auxiliary motor is unimportant. Accordingly, the negative DC potential ($-V_B$) from battery 11 is also coupled directly to the auxiliary motor 52 so that a single battery may be used to power both the traction motor 14 and the auxiliary motor 52.

The current drawn by the auxiliary motor 52, however, must also be limited when high torque is required. This may occur, for example, when the mower encounters dense grass while traveling at a high rate of speed. Consequently, the increased torque required of the auxiliary motor 52 results in increased motor current ($I_{AM}$).

Accordingly, a resistor 53 is inserted in series with auxiliary motor 52 between the negative terminal of battery 11 and ground to monitor the motor current. A pair of resistors 54 and 55 couple the corresponding voltage analog developed across resistor 53 to the inputs of amplifier 56. A potentiometer 57, connected between the $-V_C$ and $-V_D$ DC potentials, has its wiper arm coupled through resistor 58 to the input of amplifier 56. Potentiometer 57 is adjusted to provide a DC potential at the input of amplifier 56 corresponding to the maximum current ($I_{AM}$) which can be safely drawn by the auxiliary motor 52. Consequently, when the motor current ($I_{AM}$) exceeds the preselected threshold level, the amplifier 56 develops a negative DC output voltage which is, in turn, coupled by diode 59 to the junction of resistors 24 and 25. Thus, the accelerator control voltage applied to the input of error amplifier 17 during normal operation is overriden by the DC control voltage from amplifier 56 because the output impedance of amplifier 56 is very low compated to the impedance of resistors 24 and 25. Again, a capacitor 60 interconnects the output and input of amplifier 56 to suppress ripple in the DC control voltage developed by amplifier 56.

The resultant negative voltage developed at the output of error amplifier 17 decreases so that the duty cycle of the pulses developed by NAND gate 29 is correspondingly decreased. Thus, the pulses generated at the output of power switch 13 and applied to the traction motor 14 have a reduced width thereby reducing the DC voltage applied to the traction motor 14. Accordingly, the mower's speed is reduced to a point where the torque required of the auxiliary motor 52 is such that the auxiliary current ($I_{AM}$) is limited to the maximum current threshold set by potentiometer 57.

Accordingly, there has been shown an apparatus for reducing the speed of an electrically powered mower's traction motor whenever the traction motor or the auxiliary motor is overloaded. Thus, if the current drawn by the traction motor increases above a threshold level when, for example, the mower is driven up a hill or, alternatively, is being accelerated, the control apparatus is effective to reduce the mower's speed until the traction motor current ($I_{TM}$) is below the threshold. Thus, the mower's speed is gradually increased as loading of the traction motor decreases. Further, the motor speed control apparatus of the present invention samples the current drawn by the auxiliary motor to reduce the traction motor speed whenever the auxiliary motor is overloaded due to the excessive speed at which the mower is traveling through high or dense grass. Finally, the control apparatus disables the traction motor if the vehicle strikes an immovable object (e.g., a tree) so that the motor is not damaged by the instantaneous currents developed therein. The traction motor remains disabled until the obstacle is removed or the mower is redirected around the object.

Although the present invention is particularly adapted for use in a lawn mower, the invention is equally applicable to other types of machines powered by electric traction motors, such as snow blowers, and any desired number of auxiliary motors may be provided.

While a particular embodiment of the present invention has been shown and described, it will be obvious to those skilled in the art that various changes and modifications may be made without departing from the invention in its broader aspects. Accordingly, the aim in the appended claims is to cover all such changes and

I claim:

1. In a battery-powered vehicle having a traction motor for propelling said vehicle and an auxiliary motor for driving cutting tools associated therewith, apparatus comprising:

battery means including a battery for applying a DC potential to said traction motor and said auxiliary motor;

stabilizing means coupled intermediate said battery means and said traction motor for receiving said DC potential from said battery means and applying a stabilized DC potential to said traction motor, said stabilizing means including:

a. switching mode regulator means coupled to said battery means for stabilizing said DC potential and applying said stabilized DC potential to said traction motor, said switching mode regulator means including means for generating a pulse train having a variable duty cycle, said stabilized DC potential developed by said switching mode regulator means being proportional to said duty cycle;

b. amplifier means including an operational amplifier with input and output terminals and having means for establishing a preselected potential level at which said stabilized DC potential is to be maintained, said amplifier means further including means for coupling said stabilized DC potential from said switching mode regulator means to said operational amplifier input terminal, said operational amplifier developing an error signal at said output terminal representative of any deviation of said stabilized DC potential from said preselected potential level; and c. gating means coupled intermediate said operational amplifier output terminal and said switching mode regulator means and responsive to said error signal for controlling said pulse train duty cycle to maintain said stabilized DC potential at said preselected potential level;

current limiting means coupled to said traction motor and said auxiliary motor and including means for establishing maximum traction motor and auxiliary motor current threshold levels, said current limiting means monitoring the current through both of said motors and generating a control signal whenever said current through either of said motors exceeds the corresponding one of said maximum current threshold levels, said control signal being coupled to said operational amplifier input terminal to modify said error signal developed by said operational amplifier and thereby effect a reduction in the level of said stabilized DC potential applied to said traction motor by said switching mode regulator means; and high-speed comparator means coupled to said traction motor and including means for establishing a maximum instantaneous current threshold level, said high-speed comparator means monitoring the instantaneous current through said traction motor and disabling said switching mode regulator means whenever said instantaneous current exceeds said maximum instantaneous current threshold level thereby interrupting the application of said stabilized DC potential to said traction motor.

2. In a battery-powered vehicle having a traction motor for propelling said vehicle and an auxiliary motor for driving cutting tools associated therewith, apparatus comprising:

battery means including a battery for applying a DC potential to said traction motor and said auxiliary motor;

stabilizing means coupled intermediate said battery means and said traction motor for receiving said DC potential from said battery means and applying a stabilized DC potential to said traction motor, said stabilizing means including:

a. switching mode regulator means coupled to said battery means for stabilizing said DC potential and applying said stabilized DC potential to said traction motor, said switching mode regulator means including means for generating a pulse train having a variable duty cycle, said stabilized DC potential developed by said switching mode regulator means proportional to said duty cycle;

b. amplifier means including an operational amplifier with input and output terminals and having means for establishing a preselected potential level at which said stabilized DC potential is to be maintained, said amplifier means further including means for coupling said stabilized DC potential from said switching mode regulator means to said operational amplifier input terminal, said operational amplifier developing an error signal at said output terminal representative of any deviation of said stabilized DC potential from said preselected potential level; and c. gating means including a logic gate with input and output terminals and having a switching threshold, said gating means further including means for generating a sawtooth voltage waveform and AC coupling said sawtooth voltage waveform to said logic gate input terminal and means for DC coupling said error signal from said operational amplifier output terminal to said logic gate input terminal, said error signal setting the DC level of said sawtooth voltage waveform to determine what portion of said sawtooth voltage waveform exceeds said logic gate switching threshold, said logic gate generating output pulses during intervals when said sawtooth voltage waveform exceeds said logic gate switching threshold, said logic gate output pulses having pulse widths corresponding to the level of said error signal, said logic gate output pulses being coupled to said switching mode regulator means to maintain said switching mode regulator means pulse train duty cycle constant;

current limiting means coupled to said traction motor and said auxiliary motor and including means for establishing maximum traction motor and auxiliary motor current threshold levels, said current limiting means monitoring the current through both of said motors and generating a control signal whenever said current through either of said motors exceeds the corresponding one of said maximum current threshold levels, said control signal being coupled to said operational amplifier input terminal to modify said error signal developed by said operational amplifier and thereby effect a reduction in the level of said stabilized DC potential applied to said traction motor by said switching mode regulator means; and high-speed comparator means coupled to said traction motor and including means for establishing a maximum instantaneous current threshold level, said high-speed comparator means monitoring the instantaneous current through said traction motor and disabling said switching mode regulator means whenever said instantaneous current exceeds said maximum instantaneous current threshold level thereby interrupting the application of said stabilized DC potential to said traction motor.

3. Apparatus in accordance with claim 2 wherein said current limiter means includes first amplifier means coupled intermediate said traction motor and said stabilizing means operational amplifier input terminal and further includes second amplifier means coupled intermediate said auxiliary motor and said stabilizing means operational amplifier input terminal, said first amplifier means monitoring said traction motor current and generating said control signal whenever said traction motor current exceeds said maximum traction motor current threshold level and said second amplifier means monitoring said auxiliary motor current and generating said control signal whenever said auxiliary motor current exceeds said maximum auxiliary motor current threshold level.

4. Apparatus in accordance with claim 3 including means comprising a first resistive element coupled in series with said traction motor for developing a voltage analog thereacross representative of said current drawn by said traction motor and a second resistive element coupled in series with said auxiliary motor for developing a voltage analog thereacross representative of said current drawn by said auxiliary motor and wherein said first and second amplifier means each comprise an operational amplifier having input and output terminals, said first operational amplifier input terminals and said second operational amplifier terminals being coupled across said first resistive element and said second resistive element respectively and said first and second operational amplifier output terminals being coupled to said input terminal of said operational amplifier in said stabilizing means.

5. Apparatus in accordance with claim 4 including accelerator means for selectively varying said preselected potential level at which said stabilized DC potential is maintained by said amplifier means in said stabilizing means, said accelerator means being coupled to said stabilizing means operational amplifier input terminal by means comprising a pair of series-connected resistors having a common junction, said first and second current limiting operational amplifier output terminals being coupled to said junction, said first and second operational amplifiers having a low output impedance relative to the impedance of said series-connected resistors so that either of said current limiting amplifier control signal overrides said accelerator means to modify said preselected potential level.

6. Apparatus in accordance with claim 2 wherein said high-speed comparator means comprises amplifier means including an operational amplifier with input terminals coupled to said traction motor and switch means coupling said amplifier means to said gating means, said amplifier means generating an output signal whenever said instantaneous current through said traction motor exceeds said maximum instantaneous current threshold level, said switch means disabling said gating means responsive to said output signal to block the application of said logic gate output pulses to said switching mode regulator means thereby interrupting spplication of said stabilized DC potential to said traction motor by said switching mode regulator means.

7. Apparatus in accordance with claim 6 wherein said switch means comprises a flip-flop having an input terminal coupled to said amplifier means and an output terminal and wherein said gating means includes a second logic gate having a first and second input terminals coupled to said output terminal of said first logic gate and a said flip-flop output terminal respectively and an output terminal coupled to said switching mode regulator means, said flip-flop disabling said second logic gate responsive to said high-speed comparator amplifier means generating said output signal when said traction motor current exceeds said maximum instantaneous current threshold level.

8. Apparatus in accordance with claim 7 including clock means generating clock pulses, said clock pulses being coupled to said flip-flop to periodically reset said flip-flop thereby enabling said second logic gate so that said first logic gate output pulses are coupled to said switching mode regulator means, said switching mode regulator means being enable to apply said stabilized DC potential to said traction motor.

* * * * *